United States Patent [19]

Keith et al.

[11] 4,162,437

[45] Jul. 24, 1979

[54] MOTOR ACCELERATION AND STARTING TORQUE CONTROL

[75] Inventors: James D. Keith, Port of Spain, Trinidad and Tobago; Bruce E. Gray, York, Pa.

[73] Assignee: Incom International, Pittsburgh, Pa.

[21] Appl. No.: 718,128

[22] Filed: Aug. 27, 1976

[51] Int. Cl.² .............................................. H02H 7/08
[52] U.S. Cl. ................................... 318/410; 318/391; 318/400
[58] Field of Search ................... 318/64, 94, 163, 276, 318/386, 391, 392, 394, 400, 404, 407, 408, 410, 415, 599

[56] References Cited

U.S. PATENT DOCUMENTS

| | | | |
|---|---|---|---|
| 3,582,750 | 6/1971 | Halfhill | 318/599 |
| 3,686,557 | 8/1972 | Futamura | 318/599 |
| 3,751,940 | 8/1973 | Norbeck | 318/599 |
| 3,912,994 | 10/1975 | Stovall | 318/415 |
| 3,959,704 | 4/1976 | McCrea | 318/415 |

FOREIGN PATENT DOCUMENTS 1538484 4/1970 Fed. Rep. of Germany ........... 318/599

Primary Examiner—J. V. Truhe
Assistant Examiner—M. K. Mutter
Attorney, Agent, or Firm—James C. Wray

[57] ABSTRACT

A three phase motor acceleration control fires SCR's to supply successively longer current pulses to the motor. The SCR's are controlled by comparing a chopped reference ramp and individual trigger ramps.

9 Claims, 10 Drawing Figures

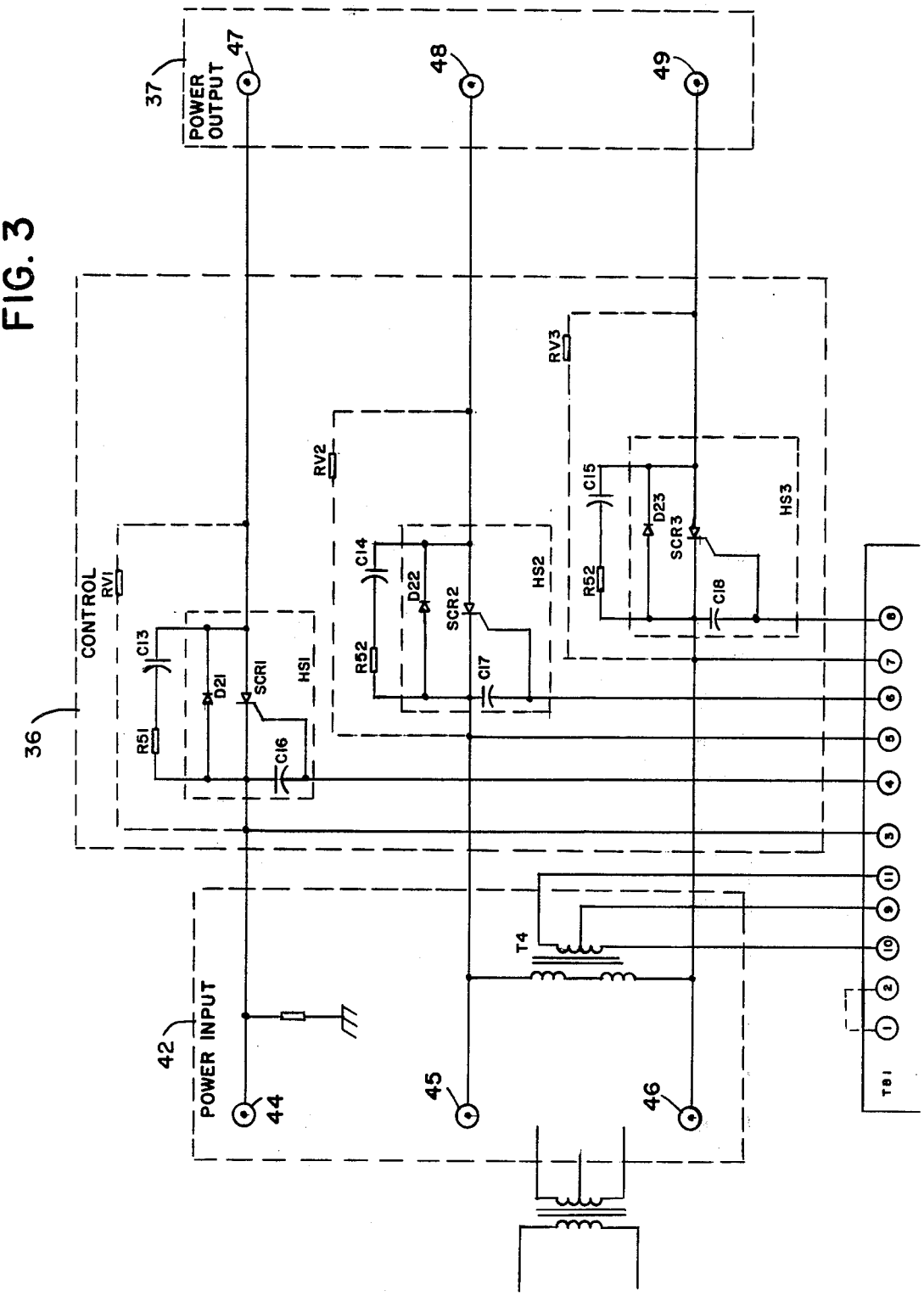

STARTING TORQUE

MOTOR ACCELERATION AND STARTING TORQUE CONTROL

BACKGROUND OF THE INVENTION

This invention concerns electronic devices for regulating starting torque and acceleration of a motor.

DESCRIPTION OF THE PRIOR ART

There have been many electronic devices to control motor acceleration. Some use ramp waveforms to produce trigger pulses. Examples of some devices which use varied waveforms are U.S. Pat. Nos. to Miller—3,543,113; Nola et al. —3,760,248; Balazis—3,588,654. Eisele et al.—3,668,495; Oster—3,911,343; Stovall—3,912,994 and Hunter—3,434,329.

SUMMARY OF THE INVENTION

The present invention is a starting torque and acceleration control system for a motor which, independently of exteranl references or feedback signals related to motor parameters, internally generates simultaneous ramp signals with opposite slope, and continuously compares the ramp signals to generate a series of pulses with periodically increasing pulsewidths. The rate of increase of pulsewidths is dependent upon the relative slopes of the ramps. The pulses, chopped at a high frequency, fire SCR's, thereby supplying power to a motor at a controlled rate.

The motor acceleration and starting torque control apparatus disclosed herein is an electronic control for periodically communicating power from a source to a motor and an electronic control operator for regulating the electronic control. The control operator internally generates a chopped reference ramp and a periodic trigger ramp upon sensing line voltage. The ramps are compared continuously, and a control pulse is generated during the time the reference ramp voltage exceeds the trigger ramp voltage. Since the two ramps have opposite slopes, the control pulse width increases on each subsequent period of the trigger ramp. The pulse activates the control permitting communication of power from the source to the motor for the duration of the pulse.

This system may be used with single or multiple phase motors. Accordingly, one object of this invention is the provision of a motor acceleration and starting torque control apparatus having power input means for connection to a source of power, power output means for connection to a motor, control means connected to the power input means and power output means for communicating power from the power input means to the power output means thereby supplying power to the power output means, and control operating means connected to the power input means and control means for regulating the control means thereby controlling power supplied to the power output means and to a motor connected to the power output means and governing the acceleration and starting torque of the motor, wherein the control operating means comprise reference signal generating means and trigger signal generating means connected to the power input means and control signal output means connected to the reference signal generating means, to the trigger signal generating means and to the control means for communicating a control signal to the control means.

Another object of the invention is the provision of a motor acceleration and starting torque control apparatus wherein the reference signal generating means has reference ramp generating means for generating a reference ramp signal.

Still another object of the invention is the provision of a motor acceleration and starting torque control apparatus wherein the trigger signal generating means having trigger ramp means for generating a repetitive ramp waveform trigger signal.

A further object of the invention is the provision of a motor acceleration and starting torque control apparatus wherein the trigger ramp generating means and the reference ramp generating means are means for generating ramps of opposite slope.

A still further object of the invention is the provision of a motor acceleration and starting torque control apparatus wherein the reference signal generating means further has oscillator means connected to the output of the reference ramp generating means for chopping the reference ramp into a series of high frequency oscillation thereby permitting small, high frequency transformers to be connected to the control signal output means, reducing the overall weight, volume, operating temperature and power dissipation of the circuit.

Another object of the invention is the provision of a motor acceleration and starting torque control apparatus wherein the control signal output means has comparator means connected to the reference ramp generating means and to the trigger ramp generating means for comparing the trigger ramp signal from the trigger ramp generating means with the reference ramp signal from the reference ramp generating means.

Still another object of the invention is the provision of a motor acceleration and starting torque control apparatus wherein the control signal output means further has pulse output means connected to comparator means and the control means for applying to the control means pulses having a pulsewidths that increase with time to regulate the control means and the supply of power to the power output means thereby regulating the power supplied to the motor connected to the power output means and allowing smooth acceleration of the motor from start to full rated speed.

A further object of the invention is the provision of a motor acceleration and starting torque control apparatus wherein the reference signal generating means includes reset means connected to the power input means and to the reference ramp generating means for detecting power supplied to the power input means and communicating a reset signal to the reference ramp generating means thereby insuring proper activation of the reference ramp generating means.

A still further object of the invention is the provision of a motor acceleration and starting torque control apparatus wherein the control signal output means further includes delay means connected to the reset means and pulse output means for communicating an activating signal from the reset means to the pulse output means sufficiently delayed to permit time for transient signals generated by the reset means to stabilize before activating the pulse output means.

Another object of the invention is the provision of a motor acceleration and starting torque control apparatus wherein the apparatus further has power supply means connected to the power input means and to the control operating means for supplying D.C. power to the control operating means.

Still another object of the invention is the provision of a motor acceleration and starting torque control apparatus wherein the means comprises multiple phase power means for connection to a single phase or three phase source of power.

A further object of the invention is the provision of a motor acceleration and starting torque control apparatus wherein the reference signal generating means further has a starting torque adjusting means for adjusting desired starting torque of the motor connected to the power output means, said adjusting means comprising a potentiometer.

A still further object of the invention is the provision of a motor acceleration and starting torque control means wherein the reference signal generating means had acceleration adjusting means for adjusting the desired acceleration of the motor connected to the power output means, said adjusting means comprising a potentiometer.

Another object of the invention is the provision of a motor acceleration and starting torque control apparatus wherein the reference ramp generating means further has an integrating means, said integrating means comprising a pair of transistors connected in Darlington arrangement with the emitter of the first stage transistor connected to circuit common through a resistor, the emitter of the second stage transistor connected directly to circuit common, the collectors of both transistors connected to the cathode of a diode having its anode connected through a resistor and starting torque adjusting potentiometer in series to a junction between a zener diode and resistor in the power supply means and to the base of the first stage transistor through a capacitor, the base of the first stage transistor further connected to circuit common through a resistor and acceleration adjusting potentiometer in series and to the cathode of a diode having its anode connected to the output of an operational amplifier in the reset means.

Still another object of the invention is the provision of a motor acceleration and starting torque control apparatus wherein the oscillator means comprises an operational amplifier with noninverting and inverting resistive feedback having the noninverting input of the amplifier connected through resistors to circuit common, to the output of said amplifier through a resistor, and to a junction between a resistor and zener diode in the power supply means, the inverting input of the amplifier series resistor and capacitor connected to the amplifier and the amplifier further connected to circuit common.

Another object of the invention is the provision of a motor acceleration and starting torque control apparatus wherein the amplifiers of the trigger ramp generating means comprises operational amplifiers from a quad operational amplifier package affording simplicity, minimum circuit components and improved matching of the generating ramp slopes.

A further object of the invention is the provision of a motor acceleration and starting torque control apparatus wherein the pulse output means has pairs of transistors connected in Darlington arrangement with the first stage transistors having emitters connected to circuit common through resistors, and bases connected to the output of the amplifiers in the comparator means and to circuit common through two resistors in series, the second stage transistor having emitter connected to circuit common and the collectors of both transistors connected to the anodes of diodes with cathodes connected to junctions between a diode and resistor in the power supply means and to transformers, the transformers further being connected to a junction between a diode and a resistor in the power supply means through a resistor to the anodes of diodes having cathodes connected to resistors, which resistors are further connected to the transformers, the junctions between said diodes and resistors connected to the gate of SCR's in the control means and the junction between said resistors and transformers connected to the power input means and junctions between resistors and capacitors in the trigger ramp generating means.

Another object of the invention is the provision of a motor acceleration and starting torque control apparatus wherein the reset means has an operational amplifier with inverting input connected through two series resistors to circuit common and through a resistor to the cathodes of diodes having anodes connected through resistors to the power input means and amplifier output connected to the anode of a diode in the reference ramp generating means and through a resistor to the base of a transistor in the delay means.

Still another object of the invention is the provision of a motor acceleration and starting torque control apparatus wherein the delay means has a pair of transistors in Darlington arrangement with the first stage transistor having emitter connected through a resistor to circuit common and base connected through a resistor to the output of an amplifier in the reset means, the second stage transistor having emitter connected directly to circuit common, and the collectors of both transistors connected through resistor to a junction between a diode and a resistor in the power supply means, the collectors further connected through a resistor and capacitor to circuit common, the junction between the resistor and capacitor connected to the cathode of a zener diode whose anode is connected through a resistor to circuit common and through separate resistors to the bases of transistors in the pulse output means.

A further object of the invention is the provision of a motor acceleration and starting torque control method comprising supplying power to an input, communicating the power from the input to an output, operating a motor with power from the output, periodically connecting the input and the output by a control and thereby controlling the communication of power from the input to the output, supplying input power to reference and trigger ramp generator, generating reference ramp and trigger ramp signals and operating the control according to the ramp signals to periodically connect the input and output for periodically supplying power to the motor.

A still further object of the invention is the provision of a motor acceleration and starting torque control method whereby increasing the amount of power periodically supplied to the motor on each subsequent period allows a smooth acceleration of the motor from start to full rated speed.

Another object of the invention is the provision of a motor acceleration and starting torque control method whereby operation of the control according to the ramp signals is achieved by comparing reference ramp and trigger ramp signals, detecting a certain relationship between the reference ramp and trigger ramp signals, generating pulse activating signals when said certain relationship is detected and operating the control according to the pulse activating signals.

Still another object of the invention is the provision of a motor acceleration and starting torque control method using the apparatus of the above objects.

A further object of the invention is the provision of a motor acceleration and starting torque control method whereby an increase in the amount of power periodically supplied to the motor on each subsequent period is attained by generating reference ramp and periodic trigger ramps, relating the ramps to produce control signal generating relationship between the reference ramp and trigger ramp signals for durations which increase on each subsequent period of the trigger ramp, thereby sustaining the control signal for periodically increasing durations, resulting in pulse output control signals having increasing pulsewidths.

A still further object of the invention is the provision of a motor acceleration and starting torque control method including generating a high frequency oscillating signal and chopping a reference ramp signal into a series of high frequency oscillations, thereby permitting the use of smaller, high frequency components.

These and other further objects and features of the invention are apparent in the disclosure which includes the above and below specification and claims and the drawings.

BRIEF DESCRIPTION OF THE DRAWINGS

FIG. 3 is a schematic circuit diagram of the control element illustrated in FIG. 1.

DETAILED DESCRIPTION OF THE DRAWINGS

Figure 1:
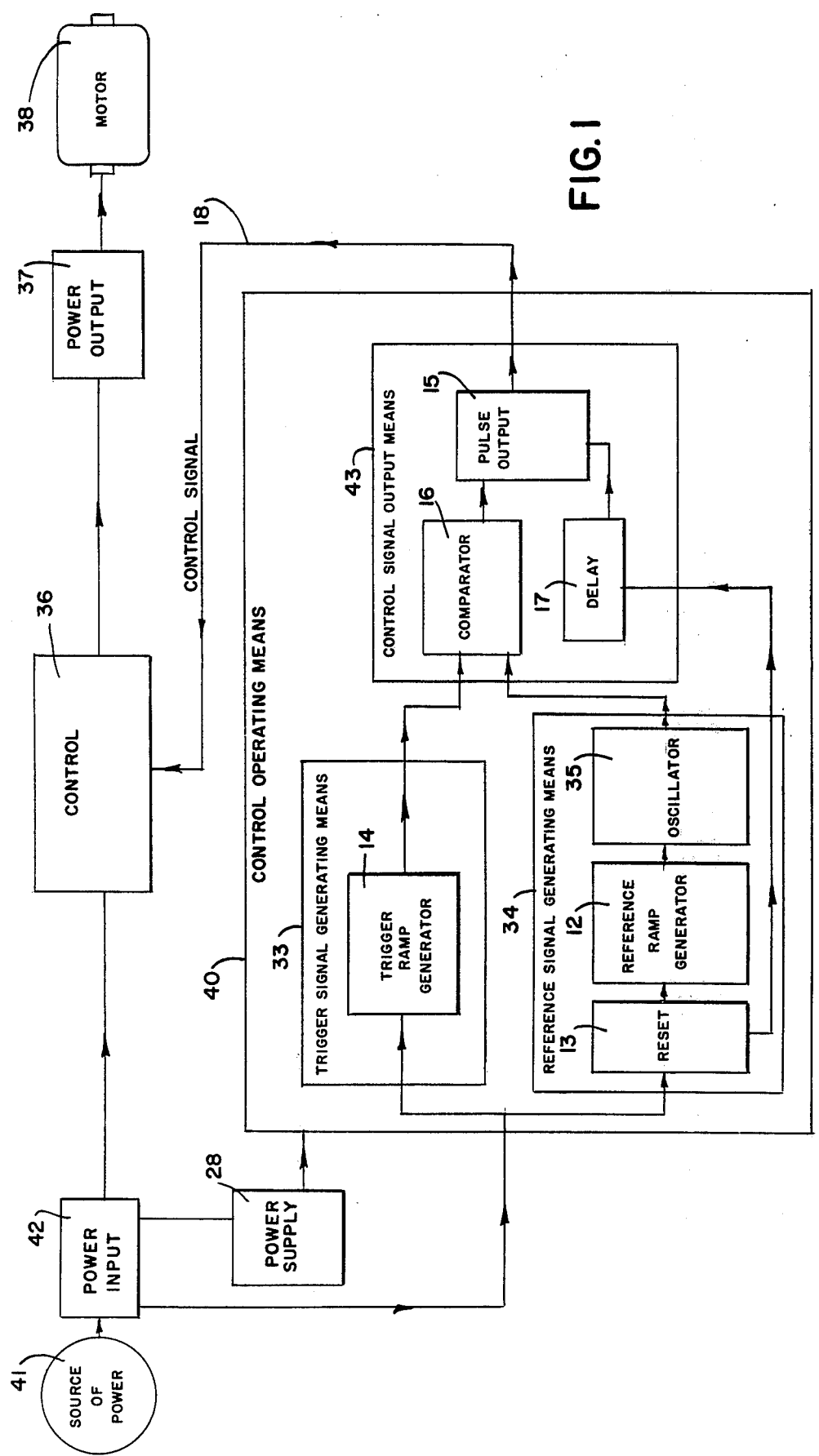
FIG. 1 is a block diagram of a motor acceleration and starting torque control system embodying the principles of this invention.

FIG. 1 illustrates the invention in simplified form. A single phase or three phase source of power 41 supplies power to a power input 42. The power input 42 transfers the power to a control 36, a power supply 28 and a control operating means 40. The power transferred to the control 36 is communicated to the power output 37 upon activation of the control 36 by the control signal 18 from control operating means 40. The power supply 28 provides D.C. bias voltage for semiconductor devices in the control operating means 40. The power transferred to the control operating means 40 generates the desired control signal 18.

Figure 4A:
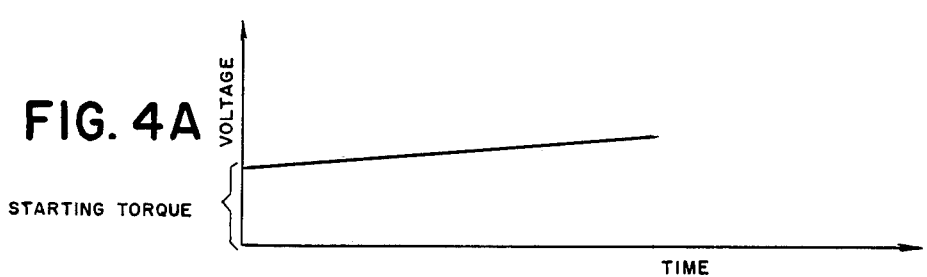
FIGS. 4A, 4B and 4C are representations of waveforms illustrating the operation of the reference ramp generating means and the effect of the oscillator means on the reference ramp generating means.
Figure 4B:
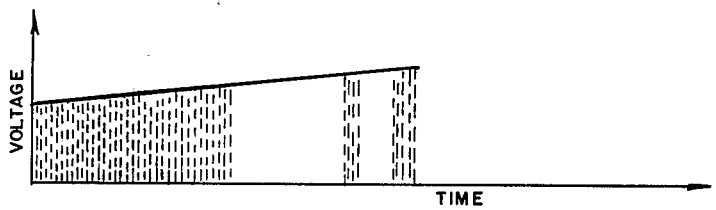
Figure 4C:
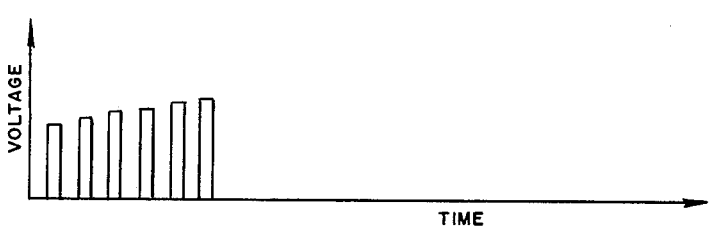
Figure 5:
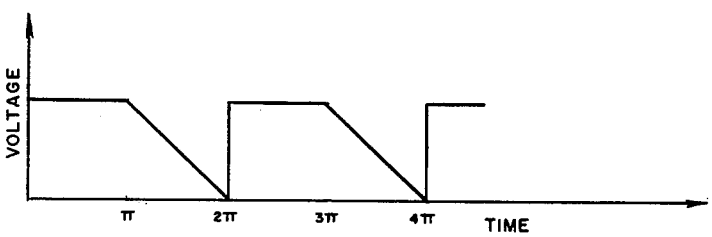
FIG. 5 is a representation of a waveform produced by a trigger ramp generating means.

The power supplied to the control operating means 40 simultaneously activates the trigger signal and reference signal generating means 33 and 34. The trigger signal generating means 33 comprises a trigger ramp generator 14 which generates a periodic ramp waveform signal upon activation. The signal is illustrated in FIG. 5. The reference signal generating means 34 comprises a reset 13, reference ramp generator 12 and oscillator 35. As the reference signal generating means 34 is activated, the reset 13 communicates a signal to the reference ramp generator 12 ensuring proper activation of the reference ramp generator 12. The reference ramp generator generates a ramp signal having a variable slope and a variable starting value to permit adjustment of desired motor acceleration and starting torque respectively. This signal is illustrated in FIG. 4A. The reference ramp signal is chopped by high frequency oscillator 35 breaking the ramp into a series of narrow, periodically rising pulses. This preserves the essential characteristic of the ramp but permits the use of smaller, high frequency components in the pulse output 15 affording reduced weight, volume, operating temperature and power dissipation in the circuit. The chopped ramp is illustrated in FIG. 4B. FIG. 4C is a magnified view of a segment of the ramp in FIG. 4B.

Figure 6A:
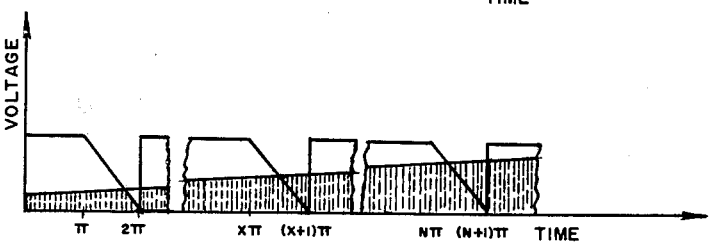
FIGS. 6A, 6B and 6C are representations of a waveform illustrating the operation of the control signal output means.
Figure 6B:
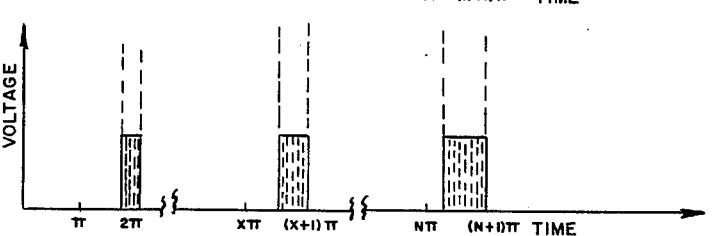
Figure 6C:
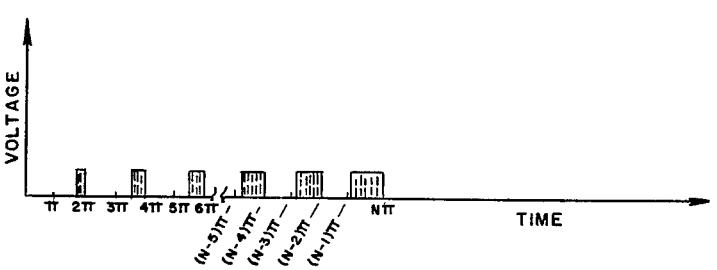

The trigger and reference signals are then applied to the control signal output means 43. The comparator 16 continuously compares the reference and trigger signals. When the comparator 16 detects reference signal voltage in excess of trigger signal voltage, it communicates an activating signal to the pulse output 15. The pulse output 15 then generates periodic pulses having pulsewidths directly related to the amount of time the reference signal voltage exceeds the trigger signal voltage. Since the reference and trigger signals have opposite slopes, the pulsewidth increases with each succeeding period of the trigger ramp. This operation of the control signal output means 43 is illustrated by FIGS. 6A and 6B. FIG. 6C illustrates the output after an extremely long time. The periodic pulses are used on the control signal 18, periodically activating the control 36, resulting in a supply of power from the power input 42 to the power output 37 directly related to the control signal 18. Since the power output 37 communicates power to a motor 38, the power supplied to the motor varies with time in a manner governed by the control signal 18.

Figure 2:
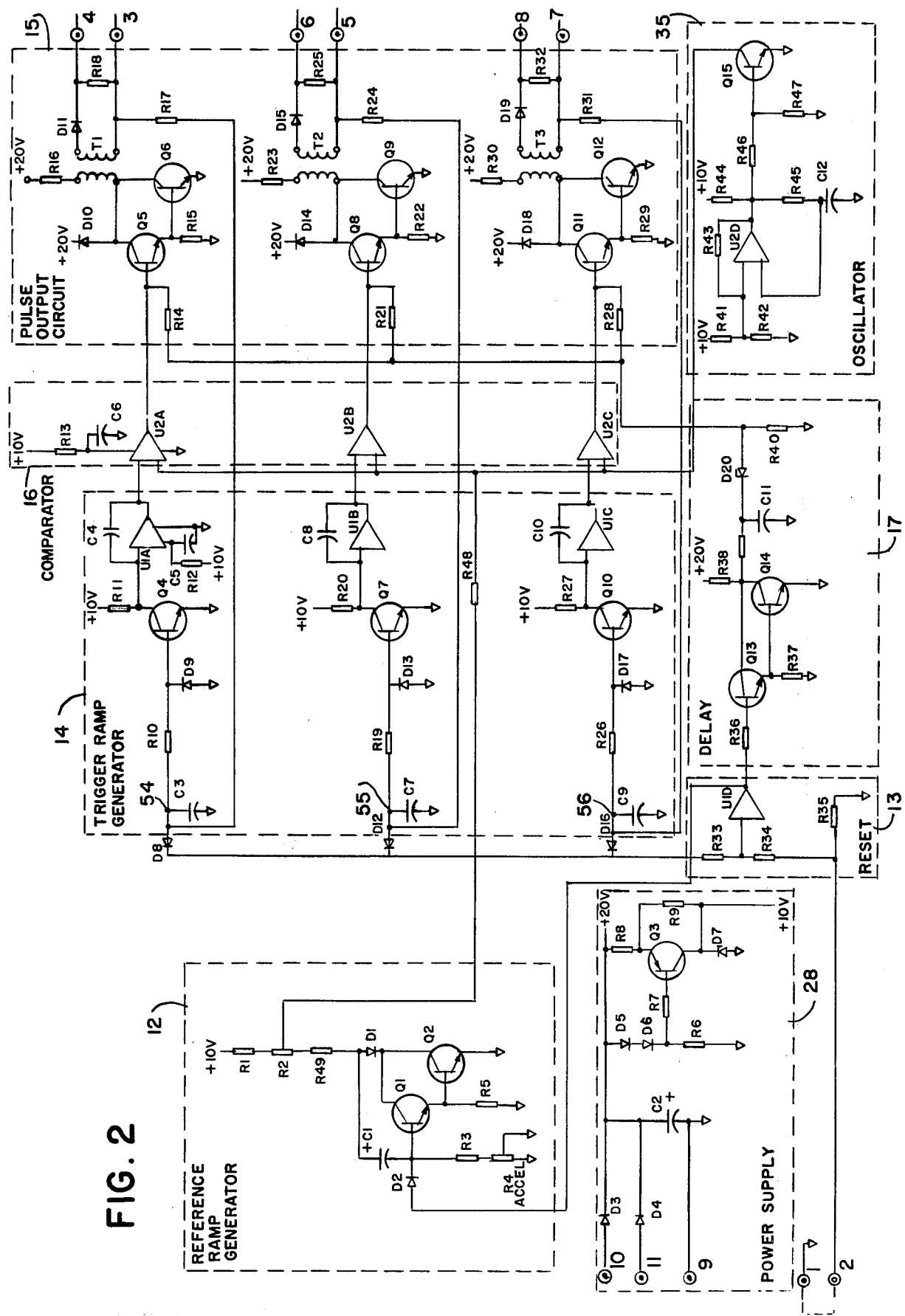
FIG. 2 is a schematic circuit diagram of the control operating means illustrated in FIG. 1.

Schematic circuit diagrams of the various elements in the block diagram of FIG. 1 are illustrated in FIGS. 2 and 3. With reference to FIG. 1, FIG. 3 shows the power input 42, control 36 and power output 37. The source of power 41 is connected to the input terminals 44, 45 and 46. Power source voltages are communicated to the control operating means 40 through terminals 3, 5 and 7, and power from transformer T4 is supplied to power supply 28 through terminals 9, 10 and 11. The corresponding terminals in the control operating means 40 and power supply 28 are identically labeled in FIG. 2.

The power supply 28 generates 10 volt and 20 volt D.C. biasing signals. This voltage is applied at various points throughout the control operating means 40 as indicated in FIG. 2.

Power source synchronization to the control operating means 40 is conducted through resistors R31, R17 and R24 and divides at junctions 54, 55 and 56 to activate the trigger signal generating means 33 and reset reference signal generating means 34.

The activating signals for the trigger ramp generators enters through resistors R10, R19 and R26. The sinusoidal signals act to turn on transistors Q4, Q7 and Q10 during positive half cycles and off during negative half cycles, changing collector impedance from low to an open circuit respectively.

Operational amplifiers U1A, U1B and U1C, are arranged with inverting feedback capacitors C4, C8 and C10, as controlled by transistors Q4, Q7 and Q10 respectively and periodically receive +10 volt potentials and function as integrating current amplifiers. The operational amplifiers are provided with noise filters represented by capacitor C5 and resistor R12. Operational amplifiers U1A, U1B and U1C are three of four operational amplifiers on a single quad amp integrated circuit chip. The fourth operational amplifier U1D is used in the reset circuit 13. The output signal from each of the operational amplifiers U1A, U1B and U1C is illustrated in FIG. 5.

The activating signal for the reference signal generating means 34 reset is fed through half wave rectifiers D8, D12 and D16 to reset 13. The output from operational amplifiers U1D insures proper resetting of reference ramp generator 12 by a reset signal applied through a diode D2. A 10 volt charging potential is supplied through resistors R1, R2 and R49 to capacitor C1, whose charging rate is controlled by resistor R3 and acceleration potentiometer R4 and Darlington pair transistors Q1 and Q2. Potentiometers R2 and R4 permit adjustment of starting ramp voltage and ramp slope respectively. The ramp signal voltage level at the R2 tap is fed to the comparator through resistor R48 and is chopped by the oscillator 35. The resulting waveform is illustrated in FIG. 4B and magnified in FIG. 4C. Chopping permits the use of small, high frequency transformers T1, T2 and T3 in the pulse output circuit 15.

The comparator 16 comprises three operational amplifiers U2A, U2B and U2C. The reference ramp is applied to the first input of the three operational amplifiers U2A, U2B and U2C and compared to the trigger ramp signals which are applied at the second inputs. When the reference voltage exceeds the trigger voltage, the outputs from the operational amplifiers U2A, U2B and U2C turn on transistors Q5, Q8 and Q11. This causes current to flow in transformers T1, T2 and T3 inducing control signal output terminals 4, 6 and 8. When the trigger voltages exceed the reference voltage, the outputs from the operational amplifiers U2A, U2B and U2C turn off the transistors Q5, Q8 and Q11. No current flows into the transformers T1, T2 and T3, and the voltage at the control signal output terminals 4, 6 and 8 goes to zero. Since the reference and trigger ramps have opposite slopes, the reference voltage will exceed the trigger voltage for longer durations with each succeeding period of the trigger pulse thereby producing periodically increasing pulsewidths in the signal at the control signal output terminals 4, 6 and 8. FIGS. 6A and 6B illustrate this operation of the comparator 16 and pulse output circuits 15. FIG. 6C illustrates the control signal from the pulse output circuit after a long time.

The delay 17 provides sufficient time for circuit transients to stabilize before allowing a control signal output. The delay time is approximately 50 milliseconds.

As indicated in FIG. 3, the control signal output terminals 4, 6 and 8 are connected to the gates of three SCR's, SCR1, SCR2 and SCR3. A pulse in the control signal fires the SCR's, SCR1, SCR2 and SCR3, permitting power to be communicated to the power output means 37 and motor 38. As pulsewidths expand, power is supplied to the motor 38 for longer periods of time. By controlling the rates of increase of pulsewidth, the acceleration of the motor 38 is controlled.

While the invention has been described with reference to a specific embodiment, modifications and variations may not depart from the scope of the invention which is defined in the following claims.

What is claimed is:

1. The motor acceleration and starting torque control apparatus comprising multiple phase power input means for connection to a single phase or three phase source of power, power output means for connection to a motor, control means connected to the power input means and power output means for communicating power from the power input means to the power output means thereby supplying power to the power output means, a power supply connected to the power input means for supplying D.C. power, control operating means connected to the power supply means and control means for regulating the control means independently of instantaneous motor parameters thereby controlling power supplied to the power output means and to a motor connected to the power output means and governing acceleration and starting torque of the motor, wherein the control operating means comprise reference ramp generating means for generating a reference ramp signal, independent of motor current feedback, wherein the reference ramp generating means further comprises reset means connected to the power input means and to the reference ramp generating means for detecting power supplied to the power input means and communicating a reset signal to the reference ramp generating means thereby insuring proper activation of the reference ramp generating means, a starting torque adjusting potentiometer for adjusting desired starting torque and an acceleration adjusting potentiometer for adjusting the desired acceleration of a motor connected to the power output means, an integrating means, said integrating means comprising a pair of transistors connected in Darlington rrangement with the emitter of the first stage transistor connected to circuit common through a resistor, the emitter of the second stage transistor connected directly to circuit common, the collectors of both transistors connected to the cathode of a diode having its anode connected through a resistor and the starting torque adjusting potentiometer in series to a junction between a zener diode and resistor in the power supply means and to the base of the first stage transistor through a capacitor, the base of the first stage transistor further connected to circuit common through a resistor and the acceleration adjusting potentiometer in series and to the cathode of a diode having its anode connected to the output of an operational amplifier in the reset means, trigger signal generating means connected to the power input means, the trigger signal generating means comprising trigger ramp generating means for generating a repetitive ramp waveform trigger signal, the trigger ramp generating means and the reference ramp generating means comprising means for generating ramps of opposite slope, and control signal output means connected to the reference ramp generating means, to the trigger signal generating means and to the control means for communicating a control signal to the control means, oscillator means connected to an output of the reference ramp generating means for chopping the reference ramp into a series of high frequency oscillations thereby permitting small, high frequency transformers to be connected to the control signal output means, reducing the overall weight, volume, operating temperature and power dissipation of the circuit, the control signal output means comprising comparator means connected to the reference ramp generating means and to the trigger ramp generating means for comparing the trigger ramp signal from the trigger ramp generating means with the reference ramp signal from the reference ramp generating means, the control signal output means further comprising pulse output means connected to the comparator means and the control means for applying to the control means pulses having a pulsewidths that increase with time to regulate the control means and the supply of power to output means thereby regulating the power supplied to the motor connected to the power output means and allowing smooth acceleration of the motor from start to full rated speed, and means connected to the reset means and pulse output means for communicating an activating signal from the reset means to the pulse output means sufficiently delayed to permit time for transient signals generated by the reset means to stabilize before activating the pulse output means.

2. The motor acceleration and starting torque control apparatus of claim 1 wherein the oscillating means comprises an operational amplifier with noninverting and inverting resistive feedback, having the noninverting input of the amplifier connected through resistors to circuit common, to a junction between a resistor and zener diode in the power supply means and to the output of said amplifier through a resistor, the inverting input of the amplifier connected to circuit common through a capacitor, the output of the amplifier connected through a resistor to a junction between a resistor and zener diode in the power supply means and through a resistor to the base of a transistor, the transistor base further connected to circuit common through a resistor, the transistor emitter connected directly to circuit common and the transistor collector connected to the noninverting inputs of the comparators in the pulse output means.

3. The motor acceleration and starting torque control apparatus of claim 2 wherein the trigger ramp generating means comprises integrating means, said integrating means comprising current amplifiers.

4. The motor acceleration and starting torque control apparatus of claim 3 wherein the trigger ramp generating means comprises operational amplifiers with inverting capacitive feedback acting as integrating current amplifiers, the inverting inputs of said amplifiers connected to junctions between resistors and zener diodes in the power supply means through resistors and to the collectors of transistors having emitters connected to common and bases connected to the cathodes of diodes with anodes connected to circuit common, the cathodes further connected through series resistors and capacitors to circuit common, the junctions of said series resistors and capacitors connected through resistors to the power input means and transformers in the pulse output means, the output of said amplifier connected to the inverting inputs of operational amplifiers in the comparator means, one of the amplifiers further connected to a noise filter means comprising a series resistor and capacitor connected to the junction between the resistor and zener diode in the power supply means and to circuit common respectively, the junction between said series resistor and capacitor connected to the amplifier and the amplifier further connected to circuit common.

5. The motor acceleration and starting torque control apparatus of claim 4 wherein the amplifiers of the trigger ramp generating means comprises operational amplifiers from a quad operational amplifier package affording simplicity, minimum circuit components and improved matching of the generated ramp slopes.

6. The motor acceleration and starting torque control apparatus of claim 5 wherein the comparator means comprises operational amplifiers with inverting input connected to the output of operational amplifiers in the trigger ramp generating means, noninverting input connected to the collectors of transistors in the oscillator means, and outputs connected to the bases of transistors in the pulse output means.

7. The motor acceleration and starting torque control apparatus of claim 6 wherein the pulse output means comprises pairs of transistors connected in Darlington arrangement with the first stage transistors having emitters connected to circuit common through resistors, and bases connected to the outputs of the amplifiers in the comparator means and to circuit common through two resistors in series, the second stage transistor having emitter connected to circuit common and the collectors of both transistors connected to the anodes of diodes with cathodes connected to a junction between a diode and resistor in the power supply means and to transformers, the transformers further being connected to a junction between a diode and a resistor in the power supply means through a resistor, to the anodes of diodes having cathodes connected to resistors, which resistors further connected to the transformers, the junctions between said diodes and resistors connected to the gate of SCR's in the control means and the junction between said resistors and transformers connected in the power input means and junctions between resistors and capacitors in the trigger ramp generating means.

8. The motor acceleration and starting torque control apparatus of claim 7 wherein the reset means comprises an operational amplifier with inverting input connected through two series resistors to circuit common and through a resistor to the cathode of a diode having anode connected through a resistor to the power input means and amplifier output connected to the anode of a diode in the reference ramp generating means and through a resistor to the base of a transistor in the delay means.

9. The motor acceleration and starting torque control apparatus of claim 8 wherein the delay means comprises a pair of transistors in Darlington arrangement with the first stage transistor having emitter connected through a resistor to circuit common and base connected through a resistor to the output of an amplifier in the reset means, the first stage transistor having emitter connected through a resistor to circuit common, the base connected through a resistor to the output of an amplifier in the reset means, the second stage transistor having emitter connected directly to circuit common, and the collectors of both transistors connected through a resistor to a junction between a diode and a resistor in the power supply means, the collector further connected through a resistor and capacitor to circuit common, the junction between the resistor and capacitor connected to the cathode of a zener diode whose anode is connected through a resistor to circuit common and through a separate resistor to the bases of the transistors in the pulse output means.

* * * * *